UNITED STATES PATENT OFFICE.

NICOLAS BOSMANN, JR., OF CHICAGO, ILLINOIS.

NUT-LOCK.

SPECIFICATION forming part of Letters Patent No. 497,531, dated May 16, 1893.

Application filed January 23, 1893. Serial No. 459,313. (No model.)

*To all whom it may concern:*

Be it known that I, NICOLAS BOSMANN, Jr., a citizen of the United States, residing at Chicago, in the county of Cook and State of Illinois, have invented certain new and useful Improvements in Nut-Locks, of which the following is a specification.

This invention relates to improvements in nut locks for wagon axles, and shafts, and may be employed on almost all appliances where nuts are not used; and it consists in certain peculiarities of the construction, novel arrangement and operation of the various parts thereof, as will be hereinafter more fully set forth and specifically claimed.

In order to enable others skilled in the art to which my invention pertains to make and use the same, I will now proceed to describe it, referring to the accompanying drawings, in which—

Figure 1, is a sectional view of a portion of a wagon wheel and axle showing the nut-lock in dotted lines. Fig. 2, is a face view of a portion of a wheel showing the nut locked on the axle. Fig. 3, is a longitudinal sectional view of a portion of the axle with the nut and lock removed therefrom. Fig. 4, is an end view of the axle as it appears when ready to receive the locking mechanism. Fig. 5, is a longitudinal sectional view of a portion of an axle with the locking mechanism in place and showing the nut locked thereby. Fig. 6, is an end view of the axle showing the nut secured thereon by means of the locking lever. Fig. 7, is a view partly in section of the locking mechanism. Fig. 8, is a detail view of the securing socket or sleeve. Fig. 9, is a plan view thereof; and Fig. 10, is a detail view of the locking lever.

Similar letters refer to like parts throughout the different views of the drawings.

A, represents a wagon axle, in the ends of which is formed a bore $a$, which extends longitudinally a slight distance therein, and has its outer portion screw-threaded as at $a'$, to engage the screw-threaded socket C, which socket is provided at its top with a groove $c'$, for the reception of a screw-driver or other device to be used for screwing the socket or sleeve into the bore. As is clearly shown in Figs. 3, 4, and 5, the bore $a$, may be placed out of the center of the circumference of the axle, and preferably toward the lower part thereof, or it may be placed in the center, and may extend longitudinally into the axle any desired distance. The end of the axle is provided with a rectangular mortise $a^2$, around the open portion of the bore $a$, for the reception of the locking lever, and has its lower portion, or that part contiguous to the periphery of the axle open, so that when the locking lever is in position to lock the nut, it, the lever will lie flush with the end of the axle. The sleeve C, is adapted to fit and to be retained in the outer end of the bore $a$, and as shown in Fig. 7, is hollow, and has the outer end of said hollow enlarged and slightly funnel-shaped or tapering as at $c^2$, in order to admit of the insertion of the eye $e$, on the locking-lever E, which eye engages with the hook $d$, on the outer end of the spring actuated rod D, and also prevents by reason of its taper or funnel-shape said rod being drawn through the hollow of the sleeve by reason of the spring.

To the inner end of the rod D, is secured a disk or button $f$, to which is secured a spring $g$, which spring encircles the extended portion of the rod D, and whose other end rests against, or may be secured to the inner end of the sleeve. The rod D, with its spring $g$, and the disk $f$, is passed through the hollow of the sleeve or socket C, when the socket may be inserted and secured into the bore $a$; the locking-lever E, is then engaged to the rod D, by means of its hook $d$, and the eye of the lever $e$, when the parts will assume the position indicated in Fig. 5. When it is desired to place the nut on the axle or shaft, the lever D, is raised to the position indicated by dotted lines in Fig. 7, and the nut is then passed over said lever, and screwed on the axle, when the lever may be released, and by reason of the spring, will be drawn into a vertical position, or that shown by continuous lines in Figs. 5 and 7, and will engage with the open mortise or depression $h$, on the outer surface of the nut H, and will thus be prevented from turning, as is obvious.

Having thus fully described my invention, what I claim as new, and desire to secure by Letters Patent, is—

1. In a nut lock the combination with an axle or shaft having a bore therein, of a sleeve or tube to engage with the outer portion of said bore, a spring-actuated rod having a hook on its outer end to engage with a locking-lever, and adapted to extend through the sleeve and into the bore and to operate therein, the locking-lever having an eye to engage the rod, substantially as described.

2. In a nut lock the combination with an axle or shaft having a screw-threaded bore, of a screw-threaded sleeve to engage said bore, and having the funnel-shaped enlargement $a^2$, in its outer end, the rod D, having the disk $f$, at its inner end, the spring $g$, and hook $d$, at its outer end, and the locking lever E, having the eye $e$, to engage the hook $d$, on the rod D, substantially as described.

3. In a nut lock the combination with the axle or shaft A, having the bore $a$, therein, and the mortise $a^2$, on its end, of the sleeve or tube C, to engage said bore and having the funnel shaped enlargement $a^2$, in its outer end, the rod D, having the spring $g$, secured around its inner portion, and the hook $d$, at its outer end, the locking lever E, having the eye $e$, to engage with the rod D, said lever being adapted to engage or lock the nut, substantially as set forth.

NICOLAS BOSMANN, JR.

Witnesses:
CHAS. C. TILLMAN,
E. A. DUGGAN.